US008856831B2

(12) United States Patent
Ahn et al.

(10) Patent No.: US 8,856,831 B2
(45) Date of Patent: Oct. 7, 2014

(54) METHOD AND APPARATUS FOR CONTROLLING SCREEN CONFIGURATION OF BROADCAST CONTENTS RECEIVED IN DIGITAL BROADCASTING RECEIVER

(75) Inventors: Tae-Min Ahn, Seoul (KR); Hoon Cho, Seoul (KR); You-Jin Lee, Seoul (KR)

(73) Assignee: Alticast Corp., Seoul (KR)

( * ) Notice: Subject to any disclaimer, the term of this patent is extended or adjusted under 35 U.S.C. 154(b) by 567 days.

(21) Appl. No.: 12/619,086

(22) Filed: Nov. 16, 2009

(65) Prior Publication Data
US 2010/0125874 A1 May 20, 2010

(30) Foreign Application Priority Data
Nov. 17, 2008 (KR) ........................ 10-2008-0113973

(51) Int. Cl.
*H04N 5/445* (2011.01)
*H04N 21/434* (2011.01)
*H04N 21/84* (2011.01)
*H04N 21/482* (2011.01)
*H04N 21/426* (2011.01)
*H04N 21/431* (2011.01)

(52) U.S. Cl.
CPC ........... *H04N 5/445* (2013.01); *H04N 21/4343* (2013.01); *H04N 21/84* (2013.01); *H04N 21/482* (2013.01); *H04N 21/42653* (2013.01); *H04N 21/4316* (2013.01)
USPC .................................. 725/41; 725/40; 725/43

(58) Field of Classification Search
CPC .............. H04N 21/234336; H04N 21/440236; H04N 21/8153; H04N 21/84
USPC ................................................ 725/40, 41, 45
See application file for complete search history.

(56) References Cited

U.S. PATENT DOCUMENTS

| 5,737,029 | A | * | 4/1998 | Ohkura et al. | 725/56 |
| 5,903,314 | A | * | 5/1999 | Niijima et al. | 725/44 |
| 6,405,371 | B1 | * | 6/2002 | Oosterhout et al. | 725/39 |
| 6,918,132 | B2 | | 7/2005 | Gargi | |
| 7,757,252 | B1 | * | 7/2010 | Agasse | 725/41 |
| 2002/0059581 | A1 | * | 5/2002 | Billock et al. | 725/25 |
| 2002/0194591 | A1 | * | 12/2002 | Gargi | 725/32 |
| 2004/0233238 | A1 | | 11/2004 | Lahdesmaki | |
| 2005/0125827 | A1 | * | 6/2005 | Moreau et al. | 725/52 |
| 2007/0011702 | A1 | * | 1/2007 | Vaysman | 725/45 |
| 2007/0182855 | A1 | * | 8/2007 | Nadarajah | 348/565 |
| 2008/0235737 | A1 | * | 9/2008 | Read | 725/52 |
| 2011/0072463 | A1 | * | 3/2011 | Zaslavsky et al. | 725/41 |
| 2011/0239252 | A1 | * | 9/2011 | Kazama et al. | 725/41 |

FOREIGN PATENT DOCUMENTS

EP 0 725 538 B1 1/2002

* cited by examiner

*Primary Examiner* — Junior Mendoza
(74) *Attorney, Agent, or Firm* — Jefferson IP Law, LLP

(57) ABSTRACT

Disclosed a method and apparatus for providing received broadcast data in a digital broadcasting system. The apparatus for controlling a screen configuration in a digital broadcasting receiver includes: a data reception/conversion unit for receiving head-end-side data including configuration data of lattice-type moving picture contents sent through a broadcasting network, and converting the received data into content screen configuration data; and a content screen configuration unit for editing content screen configuration data converted by the data reception/conversion unit, disposing the content screen configuration data according to each category in a display means of a user terminal, and performing a control operation such that the first category and the last category among multiple categories displayed through the display means are cyclically connected and displayed.

15 Claims, 15 Drawing Sheets

| Drama & Movie | Sports & Leisure | News & Reality | Movie & Theater | Show & Entertainment |
|---|---|---|---|---|
| 007 cinemax<br>IMAGE 21<br>SPEED RACER | 004 BBC PRIME<br>IMAGE 31<br>UEFA CUP 3 Round ITALY vs Turkey | 012 abc<br>IMAGE 41<br>Nightline Special | IMAGE 51 | 007 SHOWTIME<br>IMAGE 61<br>BON JOVI LIVE |
| 037 FOX<br>IMAGE 22<br>THE LISTENER | 020 ESPN<br>IMAGE 32<br>MLB National League LAD vs Arizona | 016 CNN<br>IMAGE 42<br>Inside Middle East | IMAGE 52 | 037 Disney<br>IMAGE 62<br>Mr. Bean |
| 055 the movie channel tmc<br>IMAGE 23 | 052 FOX<br>IMAGE 33 | 041 ESPNEWS<br>IMAGE 43 | IMAGE 53 | 055 STARZ<br>IMAGE 63 |

| Drama & Movie | Sports & Leisure | News & Reality | Movie & Theater | Show & Entertainment |
|---|---|---|---|---|
| 007 cinemax<br>IMAGE 21<br>SPEED RACER | 004 BBC PRIME<br>IMAGE 31<br>UEFA CUP 3 Round ITALY vs Turkey | 012 (abc)<br>IMAGE 41<br>Nightline Special | IMAGE 51 | 007 SHOWTIME<br>IMAGE 61<br>BON JOVI LIVE |
| 037 FOX<br>IMAGE 22<br>THE LISTENER | 020 ESPN<br>IMAGE 32<br>MLB National League LAD vs Arizona | 016 CNN<br>IMAGE 42<br>Inside Middle East | IMAGE 52 | 037 Disney<br>IMAGE 62<br>Mr. Bean |
| 055 the movie channel (tmc)<br>IMAGE 23 | 052 FOX<br>IMAGE 33 | 041 ESPNEWS<br>IMAGE 43 | IMAGE 53 | 055 STARZi<br>IMAGE 63 |

FIG.5A

| Sports & Leisure | News & Reality | Movie & Theater | Show & Entertainment | Kids & Education |
|---|---|---|---|---|
| 004 BBC PRIME<br>IMAGE 31<br>UEFA CUP 3 Round ITALY vs Turkey | 012 (abc)<br>IMAGE 41<br>Nightline Special | IMAGE 51 | 007 (SHO) WTIME<br>IMAGE 61<br>BON JOVI LIVE | 018 cinemax<br>IMAGE 71<br>Amazing Speiz |
| 020 ESPN<br>IMAGE 32<br>MLB National League LAD vs Arizona | 016 CNN<br>IMAGE 42<br>Inside Middle East | IMAGE 52 | 037 Disney<br>IMAGE 62<br>Mr. Bean | 028 FOX<br>IMAGE 72<br>THE LION KING |
| 052 FOX<br>IMAGE 33 | 041 ESPNEWS<br>IMAGE 43 | IMAGE 53 | 055 STARZi<br>IMAGE 63 | 045 the movie channel (tmc)<br>IMAGE 73 |

METHOD AND APPARATUS FOR CONTROLLING SCREEN CONFIGURATION OF BROADCAST CONTENTS RECEIVED IN DIGITAL BROADCASTING RECEIVER

PRIORITY

This application claims the priority under 35 U.S.C. §119(a) of an application entitled "Method And Apparatus For Controlling Screen Configuration Of Broadcast Contents Received In Digital Broadcasting Receiver" filed in the Korean Industrial Property Office on Nov. 17, 2008 and assigned Serial No. 10-2008-0113973, the contents of which are hereby incorporated by reference.

BACKGROUND OF THE INVENTION

1. Field of the Invention

The present invention relates to a method and apparatus for providing received broadcast data in a digital broadcasting system, and more particularly to a screen display method and apparatus for a digital broadcasting receiver receiving broadcast contents.

2. Description of the Related Art

Recently, a broadcasting environment is changing according to the development of broadcasting technologies and a change in demand of viewers.

That is, broadcasting environment transits from analog broadcasting to digital broadcasting, broadcasting media are varied from only terrestrial wave to cable, satellite, etc., and two-way service is being provided in cooperation with communication networks, so that the recent broadcasting environment undergoes a greater change than any other fields.

A representative service appearing under such an environment is Internet Protocol Television (IPTV) service, which is a digital broadcasting service based on an Internet protocol. IPTV service is two-way television service provided through the use of very high speed Internet access, in such a manner as to connect a television receiver with contents provision servers through the Internet by means of a TV set-top box, which is a digital broadcasting receiver, and to provide broadcasts and various contents to the television receiver. Such IPTV service may be a type of digital convergence in terms of a combination of Internet and television. In addition, broadcasting through IPTV service is different from normal sky-wave broadcasting in that a viewer can selectively view desired programs at his/her convenience.

Meanwhile, a digital broadcasting receiver based on IPTV service supports an electronic program guide (EPG) service for the convenience of the users. The EPG service displays a list of channels being broadcasted in the form of text when the signal of a specified function key is input, thereby helping the user to select a channel. The channel selection using the EPG service is performed in such a manner that the user selects a desired channel by adjusting channel up/down keys in a remote controller at the state where a list of channels is displayed in the form of text, or that the user directly inputs a confirmed channel number. Such a normal channel selection manner increases required time and user inconvenience during channel search as the number of channels provided through digital broadcasting increases. In addition, according to the conventional EPG service, since a list of channels is provided in the form of text, it is difficult to exactly understand the characteristics and contents of a broadcast provided through a corresponding channel.

Therefore, it is urgent to develop a method for efficiently disposing a plurality of moving picture contents so as to enhance visibility and to facilitate content search and selection by the user.

SUMMARY OF THE INVENTION

Accordingly, the present invention has been made to solve the above-mentioned problems occurring in the prior art, and the present invention provides a method and apparatus for controlling screen configuration so as to enhance the visibility of the user in a digital broadcasting receiver receiving moving picture contents.

In addition, the present invention provides a method and apparatus for controlling screen configuration so that a plurality of moving picture channels can be easily searched in a digital broadcasting receiver.

In addition, the present invention provides a method and apparatus for controlling screen configuration so that the user can easily search a plurality of moving picture channels in a digital broadcasting receiver while data of a broadcast selected by the user is being provided.

In accordance with an aspect of the present invention, there is provided an apparatus for controlling a screen configuration in a digital broadcasting receiver, the apparatus including: a data conversion unit for receiving a broadcast signal through a broadcasting network, and extracting lattice-type moving picture contents configuration data from the received broadcast signal; a content screen configuration unit for outputting content screen configuration data based on lattice-type moving picture contents which constitute the lattice-type moving picture contents configuration data extracted by the data conversion unit; and a display unit for displaying multiple moving picture contents in a full-search screen according to the content screen configuration data provided from the content screen configuration unit, wherein the content screen configuration unit classifies the lattice-type moving picture contents according to categories, and configures the content screen configuration data with categories to be displayed among entire categories and with moving picture contents to be displayed according to each category to be displayed by taking a number of moving picture contents which can be displayed in the full-search screen into consideration.

In accordance with another aspect of the present invention, there is provided a method for controlling a screen configuration in a digital broadcasting receiver, the method comprising the steps of: receiving a broadcast signal through a broadcasting network; extracting lattice-type moving picture contents configuration data from the received broadcast signal; classifying lattice-type moving picture contents according to each category, the lattice-type moving picture contents constituting the extracted lattice-type moving picture contents configuration data; configuring content screen configuration data based on the lattice-type moving picture contents classified according to each category; and displaying multiple moving picture contents in a full-search screen according to the content screen configuration data, wherein the content screen configuration data is configured with categories to be displayed among entire categories and with moving picture contents to be displayed according to each category to be displayed by taking a number of moving picture contents which can be displayed in the full-search screen into consideration.

In accordance with still another aspect of the present invention, there is provided an apparatus for controlling a screen configuration in a digital broadcasting receiver, the apparatus including: a data conversion unit for receiving a broadcast signal through a broadcasting network, and extracting lattice-type moving picture content configuration data from the received broadcast signal; a content screen configuration unit for extracting multiple moving picture contents from the configuration data, and outputting content screen configuration data based on the extracted multiple moving picture contents; and a display unit for displaying the extracted multiple moving picture contents on one side of an entire screen in which displays an activated moving picture content is displayed.

In accordance with still another aspect of the present invention, there is provided a method for controlling a screen configuration in a digital broadcasting receiver, the method including the steps of: receiving a broadcast signal through a broadcasting network; extracting lattice-type moving picture content configuration data from the received broadcast signal; extracting multiple moving picture contents from the configuration data; and displaying the extracted multiple moving picture contents on one side of an entire screen in which displays an activated moving picture content is displayed.

BRIEF DESCRIPTION OF THE DRAWINGS

The above and other aspects, features and advantages of the present invention will be more apparent from the following detailed description taken in conjunction with the accompanying drawings, in which:

FIGS. 3A to 3E are views illustrating a case where moving picture contents are temporarily selected for content surfing in a screen displayed by applying a full-search mode to the display means of the user terminal according to an exemplary embodiment of the present invention;

FIGS. 5A to 5C are views illustrating a case where lattice-type moving picture contents are provided in the full-search mode proposed by the present invention.

DETAILED DESCRIPTION OF THE EXEMPLARY EMBODIMENT

Figure 1:
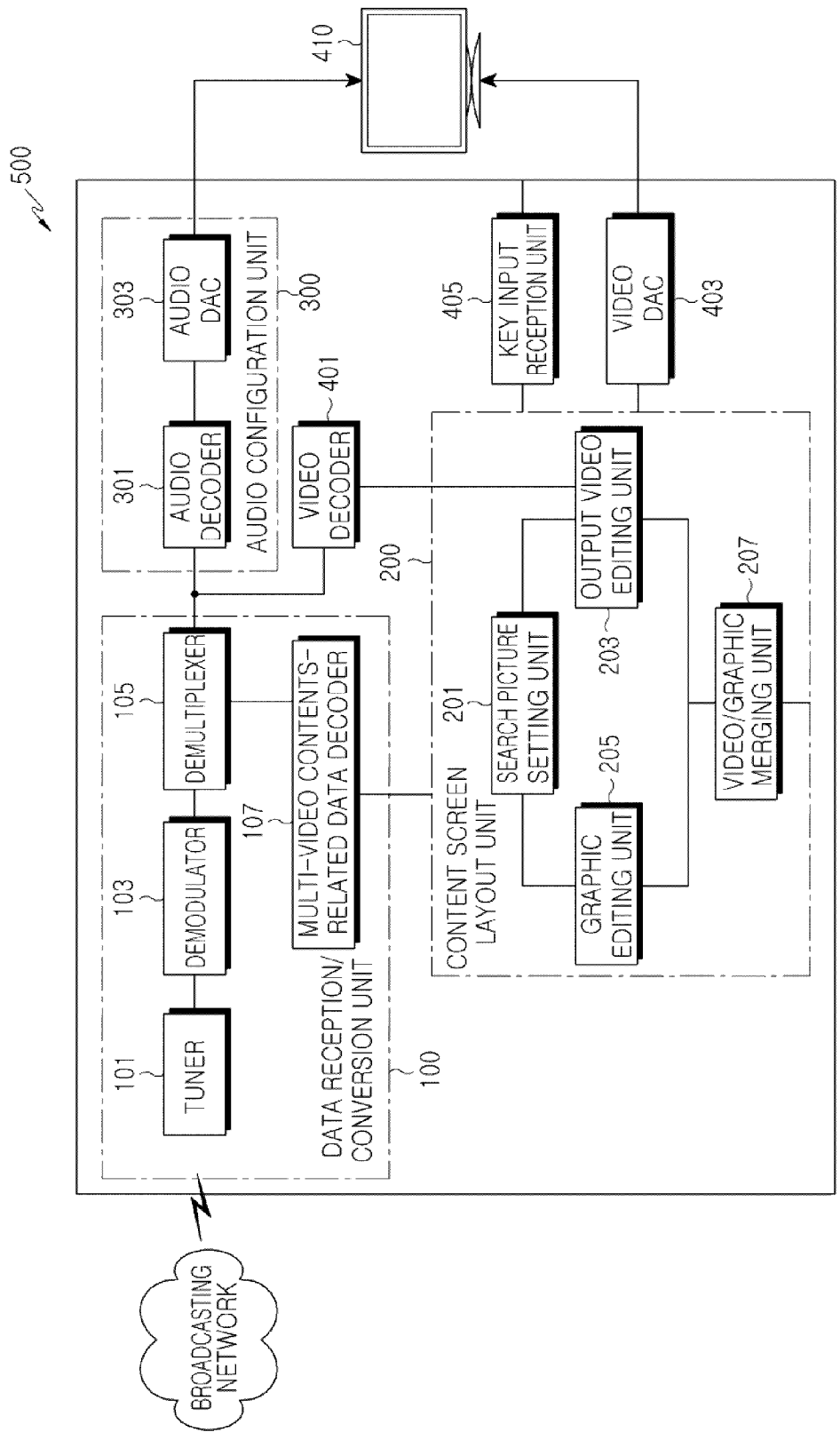
FIG. 1 is a block diagram illustrating the configuration of an apparatus for controlling a lattice-type screen configuration for moving picture contents in a digital broadcasting receiver according to an exemplary embodiment of the present invention.

Hereinafter, exemplary embodiments of the present invention will be described in detail with reference to the accompanying drawings. In addition, in the following description of the present invention, a detailed description of known functions and configurations incorporated herein will be omitted when it may make the subject matter of the present invention rather unclear.

Generally, in digital broadcasting, a broadcast signal is converted into a digital signal and is then transmitted through a satellite, a terrestrial wave, or a cable, and the user views a broadcast program through a desired broadcast channel by receiving a broadcast signal through a wired/wireless digital broadcasting receiver. Recently, various moving picture content services using a digital broadcasting receiver are provided, together with the existing terrestrial broadcasting and cable broadcasting. Therefore, in the following description, the term "moving picture contents" includes moving picture contents in a general sense, broadcasting services provided on a channel-by-channel basis, and each purchasable on-demand type broadcast item. For example, the term "moving picture contents" used herein includes film posters, the logos of broadcasting stations or distributing agencies, that provide contents, still images, etc., as well as films and contents such as broadcast services provided by broadcasting stations, and may include applications such as a game.

Therefore, a digital broadcasting receiver according to the present invention provides a channel search screen, which sequentially displays a plurality of moving picture channels broadcasting a plurality of moving picture contents in a lattice-type list (hereinafter, referred to as a "lattice-type moving picture channel list") on one screen. The lattice-type moving picture channel list is achieved by partitioning one screen into a predetermined number of rectangles and providing mutually-different moving channels through the partitioned rectangles.

Therefore, the user can search for a plurality of channels being broadcasted at one time. For example, when the lattice-type moving picture channel list supports moving pictures of 12 channels in a 4×3 array, moving pictures of 12 channels are displayed in the form of a lattice on one screen for channel search. However, in the case of a channel search screen on which the lattice-type moving picture channel list is displayed, small-sized moving pictures are simultaneously displayed on a screen having a limited size, which considerably drops the user's visibility. Accordingly, contrary to the original intention of development thereof, the lattice-type moving picture channel list rather causes difficulty in selecting a channel, so that the frequency of using the lattice-type moving picture channel list is very low.

The present invention has been made in order to achieve a more convenient use of digital broadcasting contents by reducing time for selection of a content to be used by the user, and by improving the visibility of a provided content list. A technical support environment for a high-speed editing provided in a display form for improving the visibility of the content list and reducing channel switching time according to the present invention will now be described for reference purposes.

A user's digital broadcasting receiver, to which the present invention is applied, can be implemented even in a simple channel receiver (i.e. a Zapper box) for performing only Free-To-Air (FTA) reception, as well as in a standard middleware environment, such as Multimedia Home Platform (MHP), Open Cable Application Platform (OCAP), Advanced Common Application Platform (ACAP) etc., and in a non-standard middleware environment.

FIG. 1 is a block diagram illustrating the configuration of an apparatus for controlling a lattice-type screen configuration for moving picture contents in a digital broadcasting receiver 500 according to an exemplary embodiment of the present invention.

The digital broadcasting receiver 500 includes various terminals capable of receiving a digital broadcast, such as a digital TV, a computer device equipped with a broadcast receiving module, a notebook computer, a Portable Multimedia Player (PMP), a mobile terminal, etc. Hereinafter, for convenience of description, the digital broadcasting receiver is referred to as a "user terminal."

The user terminal includes a set-top box for outputting video signals and audio signals according to broadcast signals provided from a content provider, and a video/audio output means for providing the video signals and audio signals, which are output from the set-top box, to the user. The video/audio output means may be a TV including a display means 410, such as a liquid crystal display (LCD).

For convenience of description, the following embodiment of the present invention will be described on a case where the user terminal is a set-top box.

The set-top box includes a data reception/conversion unit 100, a content screen configuration unit 200, an audio configuration unit 300, a video decoder 401, a key input reception unit 405, and a video digital-to-analog converter (DAC) 403.

The data reception/conversion unit 100 receives a broadcast signal from a content provider, converts the received broadcast signal into content screen configuration data and audio configuration data, and outputs the content screen configuration data and the audio configuration data. The broadcast signal is head-end-side data, which is produced by a content provider, i.e. a head-end that is a transmission side in a broadcasting system, and is then output through a broadcasting network. Meanwhile, the head-end-side data includes moving picture contents, moving picture-related data, and configuration data of lattice-type moving picture contents. In addition, the data reception/conversion unit 100 transfers user's content selection data, i.e. data of contents selected by the user, to a head-end side of a corresponding content provider.

The moving picture-related data of the head-end-side data is data related to moving pictures, and includes text data related to contents, still-picture data, a film poster, a logo of a broadcasting station or distributing agency, audio clip data, graphic data, etc.

The configuration data of the lattice-type moving picture contents represents data related to a configuration of a lattice-type moving picture channel list including arrangement positions, sizes, and identification information of multiple moving picture contents arranged in the form of a lattice.

The data reception/conversion unit 100 includes a tuner 101, a demodulator 103, a demultiplexer 105, and a data decoder 107.

The tuner 101 is tuned to a specific frequency band, and receives a broadcast signal transmitted in the specific frequency band through a broadcasting network. The demodulator 103 demodulates a broadcast signal of the specific frequency band, received through the tuner 101. The demultiplexer 105 extracts data from a signal obtained through the demodulation by the demodulator 103.

The data decoder 107 decodes each piece of configuration data of lattice-type moving picture contents and data (i.e. text data, still picture data, audio clip data, graphic data, a film poster, a logo of a broadcasting station or film company, a still image, etc.) other than the moving picture from among the data demultiplexed by the demultiplexer 105, and delivers the decoded data to the content screen configuration unit 200. As used herein, the lattice-type moving picture contents represent a plurality of moving picture contents which are simultaneously displayed in the form of a lattice on one screen for channel search by the user. Throughout the specification, The term "moving picture contents" will be used as meaning not only a moving picture, such as a film or a broadcast, but also a film poster, a logo of a broadcasting station or distributing agency, a still image, and an application such as a game.

The content screen configuration unit 200 configures a screen to be displayed based on content screen configuration data obtained through the conversion of the data reception/conversion unit 100. That is, the content screen configuration unit 200 analyzes the content screen configuration data received from the data reception/conversion unit 100 and the content selection data of the user input through a key input reception unit 405, and then classifies and displays a plurality of moving picture contents (hereinafter, referred to as "lattice-type moving picture contents") according to categories on one screen. Classifying and displaying lattice-type moving picture contents based on categories in the full screen according to an exemplary embodiment of the present invention, as described above, is called a "full-search mode," and the current screen provided through the display means 410 in the full-search mode is called a "full-search screen." In addition, the content screen configuration unit 200 can classify a plurality of moving picture contents according to categories through the use of information included in moving picture-related data which is received by the data reception/conversion unit 100. The moving picture-related data represents information, such as a category of moving picture contents, broadcasting hours, a program title, etc., which is related to moving picture contents and can be provided to the user.

When a key input event is generated by the user, the key input reception unit 405 transfers a corresponding key input signal to the content screen configuration unit 200 so that a moving picture content provision-related operation required by the user can be performed.

The content screen configuration unit 200 displays a plurality of moving picture contents included in the same category in the vertical direction of the screen, and disposes and displays mutually different categories in the horizontal direction of the screen. Otherwise, the content screen configuration unit 200 may dispose and display mutually different categories in the vertical direction of the screen while displaying a plurality of moving picture contents included in the same category in the horizontal direction of the screen. For example, the content screen configuration unit 200 may display a plurality of moving picture contents on one screen in such a manner as to dispose 5 mutually different categories in the horizontal direction of the screen, and to dispose 2 or 3 moving picture contents or so included in the same category in the vertical direction. In this case, the total number of moving picture contents displayed on one screen may vary depending on the entire size of the screen included in the display means 410, or depending on the size of each screen on which each moving picture content is displayed. In addition, a plurality of categories displayed in the horizontal or vertical direction are cyclically displayed while the first category and the last category are connected to each other. For example, it is assumed that the total number of categories is five. When mutually different categories are disposed in the horizontal direction, and numbers of 1, 2, 3, 4, and 5 are assigned to the categories, respectively, categories may be cyclically displayed in an order of 4-5-1-2-3-4-5-1-2 depending on left/right direction keys input by the user. Defining how to cyclically connect categories, as described above, is expressed as defining a cyclic connection relation, wherein the cyclic connection relation is defined by the content screen configuration unit 200.

In addition, when it is assumed that the total number of categories to be provided on one screen through the display means 410 is three, the content screen configuration unit 200 controls the display means 410 to display only three categories of the five categories upon provision of the full-search screen. In this case, when search for a different category is requested by the user through the key input reception unit 405, the content screen configuration unit 200 selects a category to be newly displayed and a category not to be displayed in the display means 410 by taking the cyclic connection relation between the entire categories into consideration, and generates content screen configuration data in which the category to be newly displayed and the category not to be displayed, that have been selected, are reflected. For example, under the assumption that categories corresponding to #2, #3, and #4 are currently output for the user through the display means 410, and the category corresponding to #2 is currently selected, when the user requests a category search to be performed in the left direction, content screen configuration data not displaying the category corresponding to #4 but displaying a category corresponding to #1 is generated. In contrast, when the user requests a category search to be performed in the right direction, content screen configuration data not displaying the category corresponding to #2 but displaying a category corresponding to #5 is generated.

In other words, the content screen configuration unit 200 defines a cyclic connection relation between the entire categories. When the content screen configuration unit 200 determines that it is necessary to change categories to be displayed through the display means 410 due to user's search for a plurality of moving picture contents displayed in the full-search screen, the content screen configuration unit 200 selects a category not to be displayed and a category to be displayed from among categories constituting the content screen configuration data according to the defined cyclic connection relation, and generates content screen configuration data in which the category not to be displayed and the category to be displayed, that have been selected.

While the above description has been given only on the cyclic connection relation between categories, the content screen configuration unit 200 will define a cyclic connection relation between moving picture contents even when searching for moving picture contents within an equal category, and then generate content screen configuration data in which a moving picture content to be newly displayed and a moving picture content not to be displayed are reflected according to a channel search request by the user.

In addition, when a specific moving picture content is temporarily selected by an input of an up, down, left, or right direction key, or by an input of a channel number by the user, the content screen configuration unit 200 activates the temporarily-selected specific moving picture content (hereinafter, referred to as a "temporarily selected content") in order to distinguish the temporarily selected content from the other moving picture contents, which are not selected. In addition, the content screen configuration unit 200 controls the display means 410 to activate a scroll bar for informing the user of the position of the temporarily selected and activated content within a corresponding category. The scroll bar may be activated according to each category, or with respect to the full screen. That is, when one moving picture content among multiple moving picture contents displayed through the display means 410 is temporarily selected by the user, the content screen configuration unit 200 controls the display means 410 to activate the temporarily selected moving picture content and a category including the temporarily selected moving picture content.

The content screen configuration unit 200 is constituted such that, when a play request is received from the user in a state where a temporarily selected content is activated, the temporarily selected and play-requested content (hereinafter, referred to as a "play-requested content") is provided in the full screen. The play request is issued when the user performs an input operation of a key, such as a "play" key or a "selection" key, related to provision of moving picture contents. In addition, in the course of providing the play-requested content in the full screen, when an electronic program guide (EPG) information search request is issued by the user, the content screen configuration unit 200 displays moving pictures corresponding to the respective contents of a category, to which a moving picture content (hereinafter, referred to as a "play content") currently being provided belongs, in a Picture-in-Picture (PIP) format on one side among the top, bottom left, and right sides of the screen. The EPG information search request is issued by an input of a key related to a "mini-EPG provision."

For example, an input of a key related to the mini-EPG provision corresponds to an input of a "mini-EPG" key or "mini-search mode" key. A screen in which the list of a specific category is overlapped and displayed on one side of the screen while a play-requested content is being provided in the full screen, that is, a screen providing a mini-EPG, corresponds to a "mini-search mode." In the mini-search mode, a screen provided through the display means 410 is called a "mini-search screen."

Differently from a "full-search mode," in which the list of the entire moving picture contents are classified according to categories and are displayed in the form of a lattice, the "mini-EPG" is overlapped and provided on one side of the full screen for the moving picture in the "mini-search mode," in which only one specific category is provided in the PIP format.

That is, when a request for the mini-search mode is issued by the user, the content screen configuration unit 200 provides the display means 410 with content screen configuration data including moving picture contents of a category, to which the activated moving picture content belongs, thereby performing a control operation such that the moving picture contents of a category, to which the activated moving picture content belongs, are to be displayed on one side of the full screen provided through the display means 410.

In the course of providing the user with a service in the mini-search mode, when receiving a user's surfing request (i.e. a "full-search mode" request) for the entire moving picture contents provided through a broadcasting network, the content screen configuration unit 200 performs a shift operation from a state where the play-requested moving picture content is provided in the full screen to a state where a lattice-type moving picture content provision screen (i.e. full-search mode) for surfing is provided in three dimensions. Also, when a mini-search request is issued in a state where the full-search screen is displayed, the content screen configuration unit 200 controls the display means 410 to perform a three-dimensional shift from the full-search screen to the mini-search screen. In addition, when a full-search request or a mini-search request is issued in the course of providing the activated moving picture content in the full screen, the content screen configuration unit 200 controls the display means 410 to perform a three-dimensional shift from the full screen to the full-search screen or mini-search screen. That is, when a screen shift request is issued by the user, the content screen configuration unit 200 controls the display means 410 to perform a three-dimensional shift from the current display screen to a display screen shift-requested by the user. In this case, the current display screen may be one screen among a full-search screen, a mini-search screen, and the full screen for a moving picture content.

Video data edited through the content screen configuration unit 200 is converted into analog data through the video DAC 403, and is then displayed through the display means 410. In addition, when analyzing key input data by the user and determining that final content selection data is input, i.e. that data indicating a content finally selected and determined to be used by the user from among proposed moving picture contents is input, the content screen configuration unit 200 transfers the final content selection data to the data reception/conversion unit 100 so that the final content selection data can be transmitted to a head-end side of a content provider. The final content selection data represents content data selected by an input of the user.

The content screen configuration unit 200 includes a search picture setting unit 201, an output video editing unit 203, a graphic editing unit 205, and a video/graphic merging unit 207.

The search picture setting unit 201 receives content picture configuration data and the content selection data, and then delivers the received content picture configuration data and content selection data, together with a screen configuration control signal, to the graphic editing unit 205 and the output video editing unit 203. Through the use of the data received from the search picture setting unit 201, the output video editing unit 203 displays a lattice-type moving picture content in a full-search mode through the display means 410 of the user terminal. The output video editing unit 203 performs a control operation such that a play-requested content selected by the user is displayed in a full screen through the display means 410 of the user terminal, as described above. A mode in which the play-requested content is output in a full screen through the display means 410, as described above, is called a "full-screen provision mode."

In addition, when a key input event, such as an EPG information search, is issued by the user in the course of providing a play-requested content selected by the user in a full screen, the output video editing unit 203 provides a screen in the mini-search mode. In this case, the output video editing unit 203 outputs an mini-EPG, which is to be overlapped and displayed on one side of the play-requested content, to the display means 410.

According to a screen configuration control signal received from the search picture setting unit 201, the graphic editing unit 205 controls the display of a graphic for a screen configuration, except for the lattice-type moving picture contents. For example, the graphic editing unit 205 controls the display of graphics, such as a broadcast channel number through which a moving picture content is provided, a channel logo corresponding to the broadcast channel number, the title of each category including moving picture contents, the activation of a category and moving picture content temporarily selected by a key input of the user, a scroll bar located on one side of a temporarily selected category, etc.

In addition, when it is necessary to operate in a mini-search mode according to a key input event by the user, the graphic editing unit 205 controls the display position of the mini-EPG so that the mini-EPG can be overlapped with the video/audio output means of the user terminal.

The video/graphic merging unit 207 merges a lattice-type moving picture content output from the output video editing unit 203 with a screen graphic output from the graphic editing unit 205, thereby generating a final screen to be displayed.

In addition, the audio configuration unit 300 includes an audio decoder 301 and an audio DAC 303. The audio decoder 301 decodes and outputs a piece of audio configuration data matching with a focus content, which is a content selected by the user, among pieces of audio configuration data received from the data reception/conversion unit 100. The audio DAC 303 converts the audio configuration data decoded by the audio decoder 301 into an analog signal, and outputs the analog signal to the display means 410. Depending on whether the user terminal outputs an audio signal, the audio configuration unit 300 can be optionally included in the apparatus for controlling a lattice-type screen configuration.

In the following description, a method for controlling a lattice-type moving picture content screen configuration in a digital broadcasting receiver, and screen configurations in the aforementioned full-search mode and mini-search mode according to an exemplary embodiment of the present invention will be explained in detail with reference to the accompanying drawings.

Figure 2:
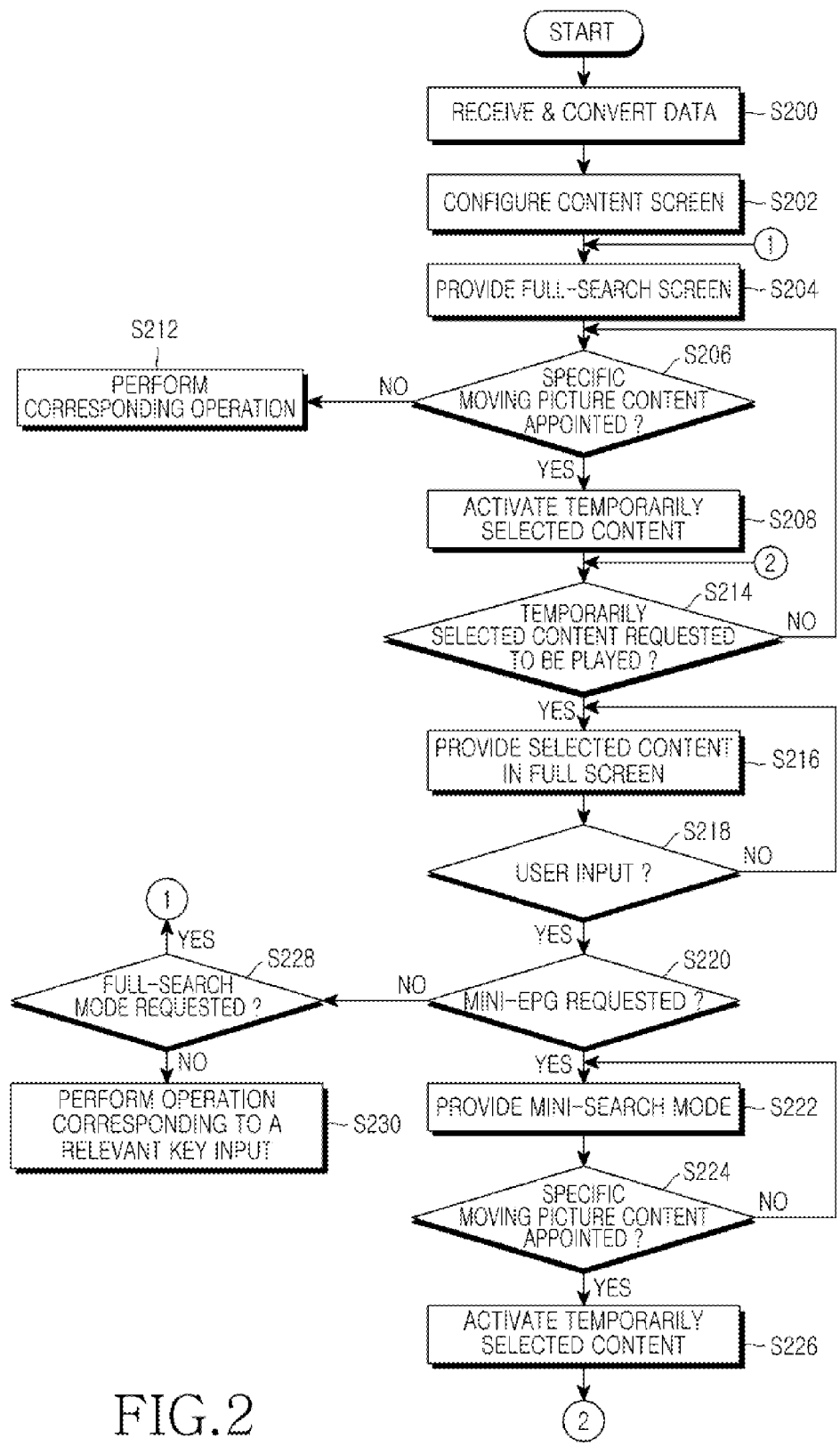
FIG. 2 is a flowchart illustrating a method for controlling a lattice-type moving picture content screen configuration in a digital broadcasting receiver according to an exemplary embodiment of the present invention.

FIG. 2 is a flowchart illustrating a method for controlling a lattice-type moving picture content screen configuration in a digital broadcasting receiver according to an exemplary embodiment of the present invention.

FIGS. 3A to 3E are views illustrating a case where moving picture contents are temporarily selected for content surfing in a screen displayed by applying a full-search mode to the display means 410 of the user terminal according to an exemplary embodiment of the present invention.

Figure 4A:
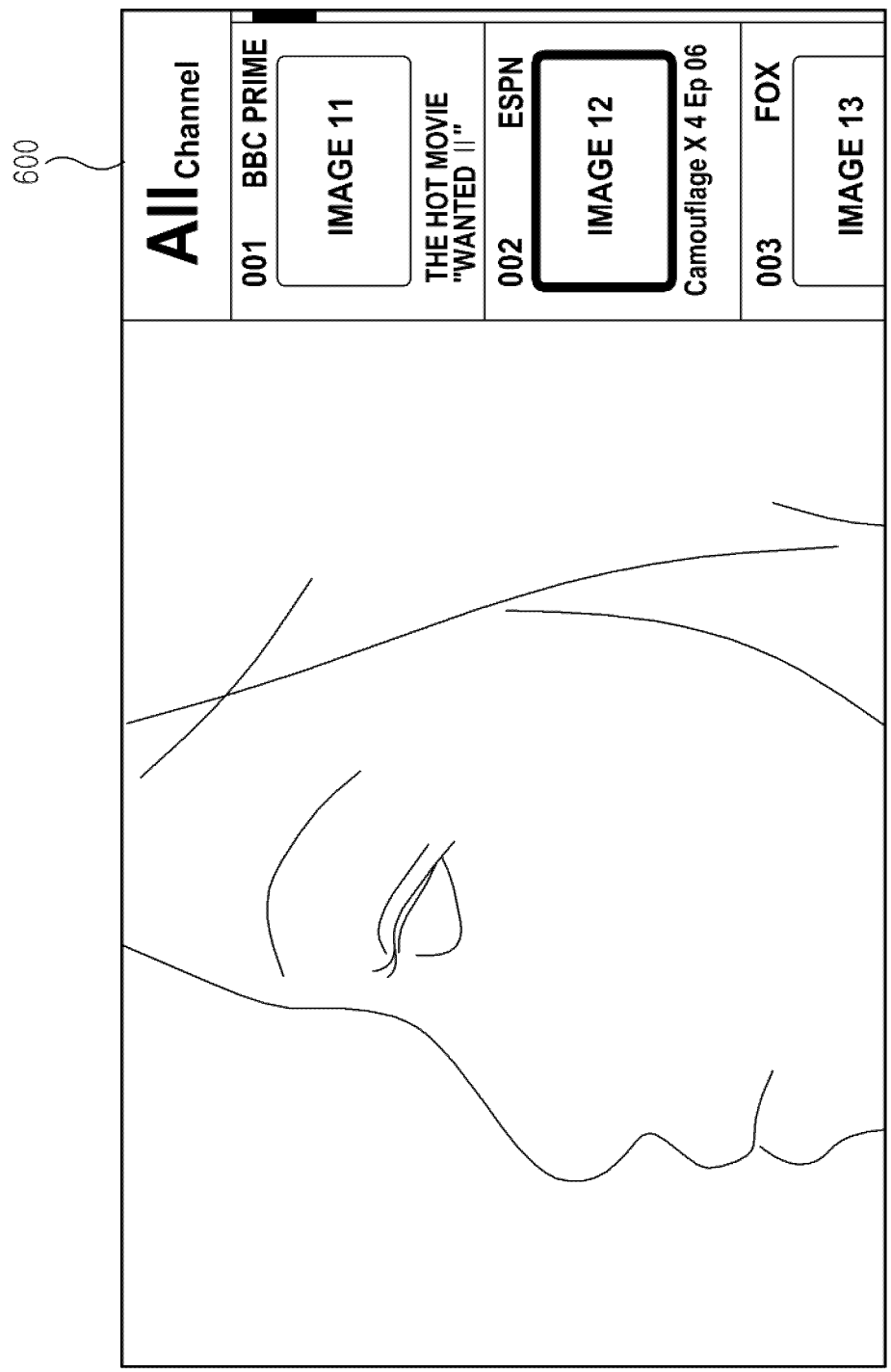
FIGS. 4A and 4B are views illustrating a case where moving picture contents are surfed using a mini-EPG in a screen displayed by applying a mini-search mode to the display means of the user terminal according to an exemplary embodiment of the present invention.
Figure 4B:
Figure 6A:
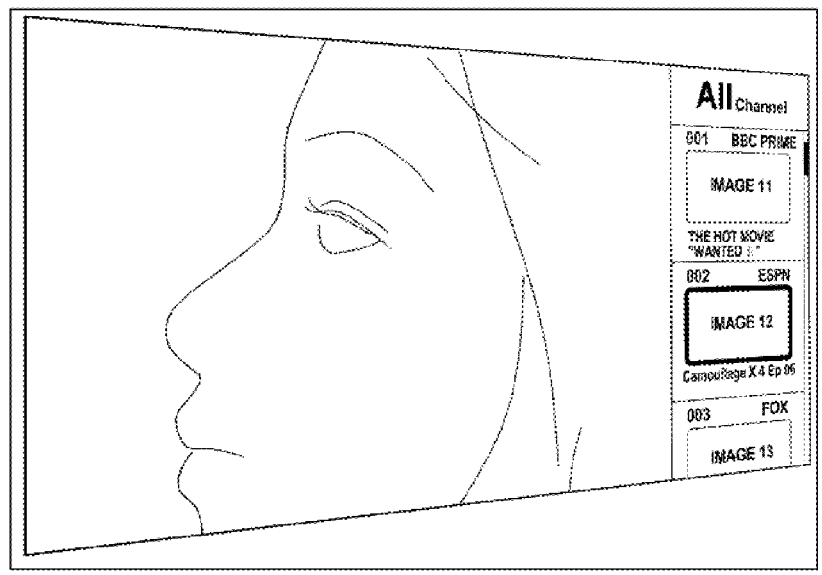
FIGS. 6A to 6F are views illustrating a case where a cubic effect is provided when a shift operation is performed from a mini-search mode to a full-search mode according to an exemplary embodiment of the present invention.
Figure 6B:
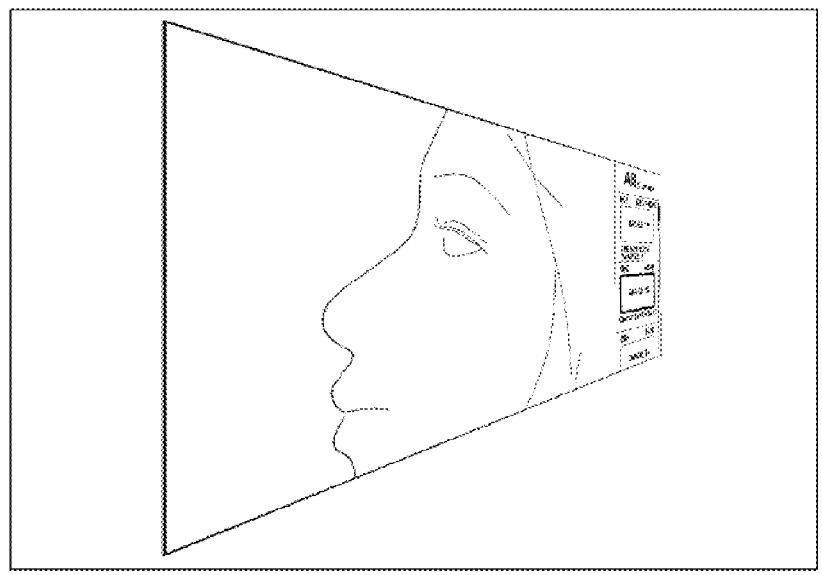
Figure 6C:
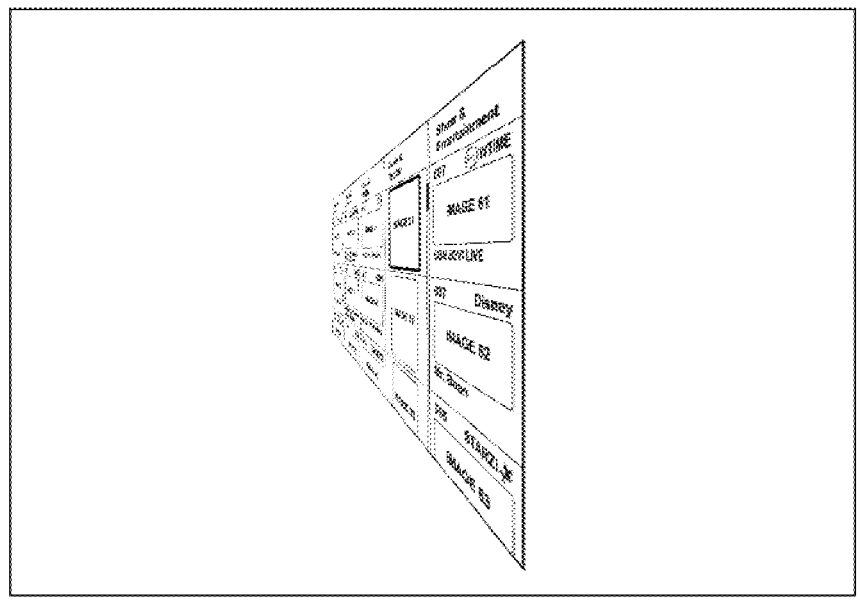
Figure 6D:
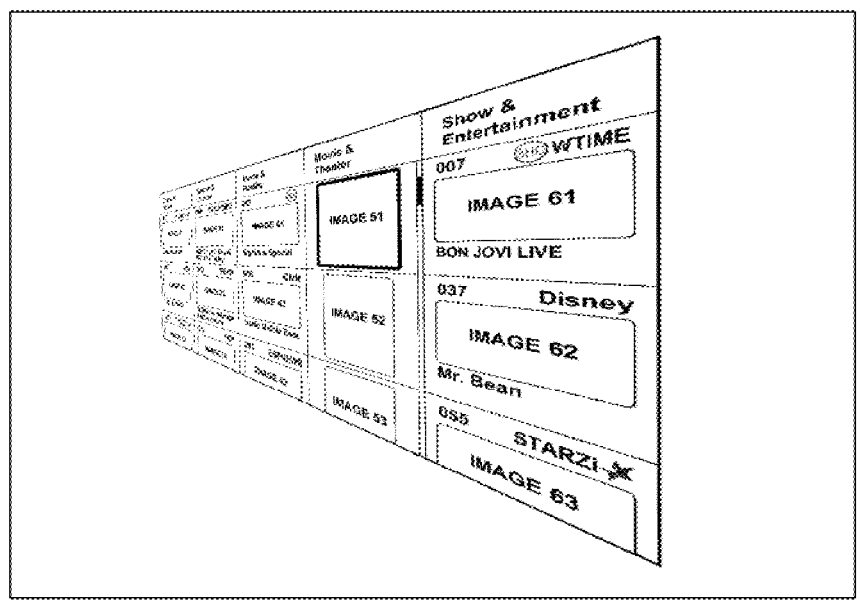
Figure 6E:
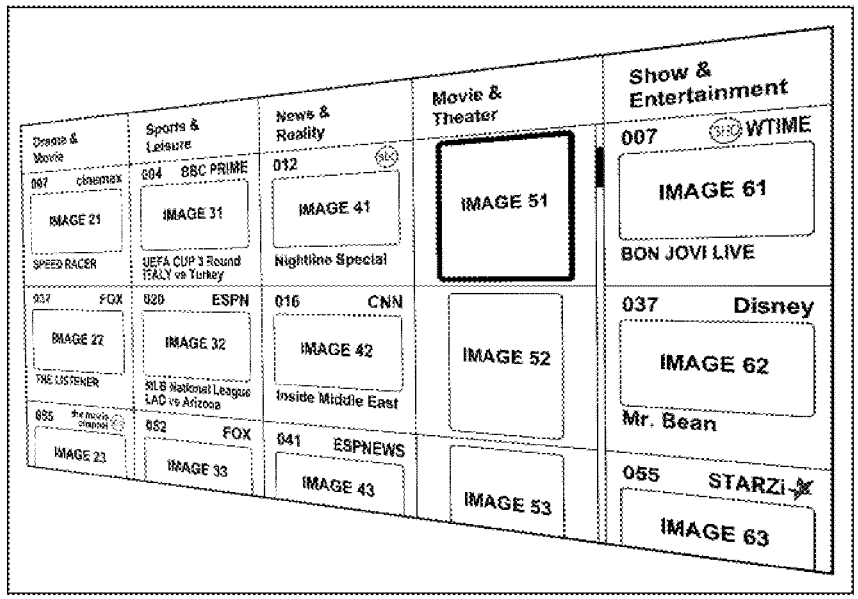
Figure 6F:
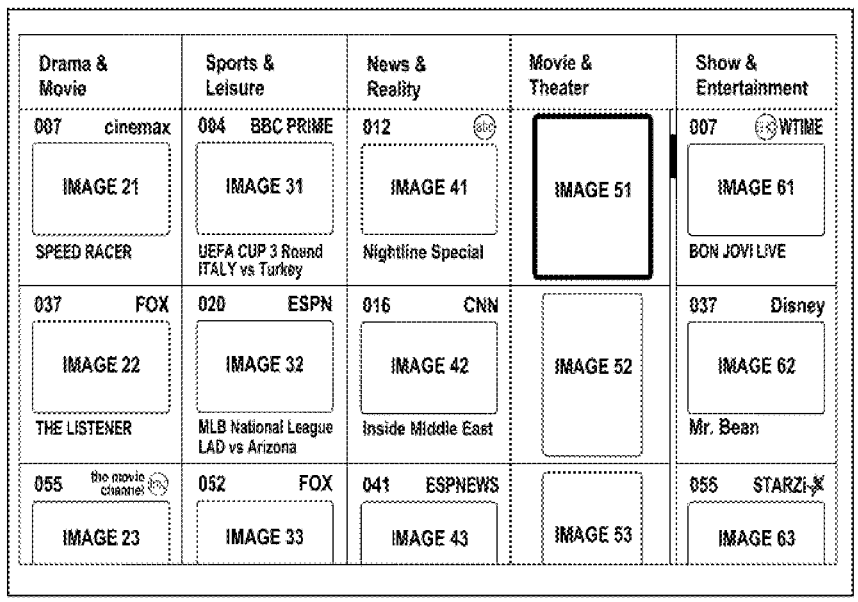

FIGS. 4A and 4B are views illustrating a case where moving picture contents are surfed using a mini-EPG in a screen displayed by applying a mini-search mode to the display means 410 of the user terminal according to an exemplary embodiment of the present invention.

First, the head-end side of a content provider produces a lattice-type moving picture content list, and then sends the produced lattice-type moving picture content list to a user terminal through a broadcasting network. In this case, the sent head-end-side data includes various pieces of data, such as moving picture contents, moving picture-related data, a lattice-type moving picture content list, etc. The head-end-side data additionally may include a media source for defining a configuration of a screen to be displayed through the display means 410 of the user terminal so that the configuration of the display screen can be determined based on the media source. In addition, after initially transmitting the media source upon the use of a moving picture content service, the head-end side may apply a change to the media source and transmit the changed media source together with other data only when the change occurs. Moreover, the media source can be implemented in various other ways. For example, the media source can be set in advance in the digital broadcasting receiver so that the digital broadcasting receiver can receive the head-end-side data and configure a moving picture content screen.

First, in step 200, the digital broadcasting receiver 500 receives head-end-side data, including EPG information, transmitted through a broadcasting network, and converts the received head-end-side data into content screen configuration data and audio configuration data. In step 202, the digital broadcasting receiver 500 configures a content screen classified according to each category with moving picture contents based on the converted content screen configuration data. In step 204, the digital broadcasting receiver 500 configures a screen of a full-search mode, and outputs the screen of the full-search mode to the display means 410 of the user terminal. In step 204, in order to provide the full-search mode proposed by the present invention, the output video editing unit 203 in the digital broadcasting receiver 500 edits moving picture contents. Also, in this case, the graphic editing unit 205 edits the titles of a categories including each moving picture content, broadcast channel numbers through which the respective moving picture contents are provided, broadcast channel logos, etc., and then outputs the edited moving picture contents to the video/graphic merging unit 207, with an indication of each region in which each edited moving picture content is to be displayed. In step 206, the digital broadcasting receiver 500 checks if a specific moving picture content is appointed by the user. In step 206, when an up, down, left, or right direction key, or a numeral key for content surfing by the user is pressed in the full-search mode, the digital broadcasting receiver 500 may determine that a specific moving picture content is appointed. For example, there may be a case where an up, down, left, or right direction key, or a numeral key for content surfing by the user is pressed in the full-search mode.

When it is determined that a specific moving picture content has been appointed in step 206, the digital broadcasting receiver 500 activates a temporarily-selected content data in step 208. Explaining the procedure of step 206 in more detail, the graphic editing unit 205 and output video editing unit 203 in the digital broadcasting receiver 500 configures a screen for providing the content selected in step 206, and transfers the configured screen to the video/graphic merging unit 207. The graphic editing unit 205 controls a screen graphic so as to activate a moving picture content temporarily selected by input of a direction key or numeral key, and to activate and display a scroll bar on one side of a category to which the activated content belongs.

The screen configuration as described in steps 204 to 208 is explained with reference to FIGS. 3A to 3E.

FIGS. 3A to 3E show a case where lattice-type moving picture contents are provided in a full-search mode according to an exemplary embodiment of the present invention. First, referring to FIG. 3A, it can be understood that the display means 410 of the user terminal currently displays categories from a Game & Local Service category to a Sports & Leisure category. The number of categories displayed on one screen may vary depending on the resolution or the size of the screen. In addition, referring to FIG. 3A, it can be understood that 2 or 3 moving picture contents included in each category are displayed, and similarly, the number of moving picture contents included in each category may vary depending on the resolution or the size of the display means 410 in the user terminal.

Figure 3A:
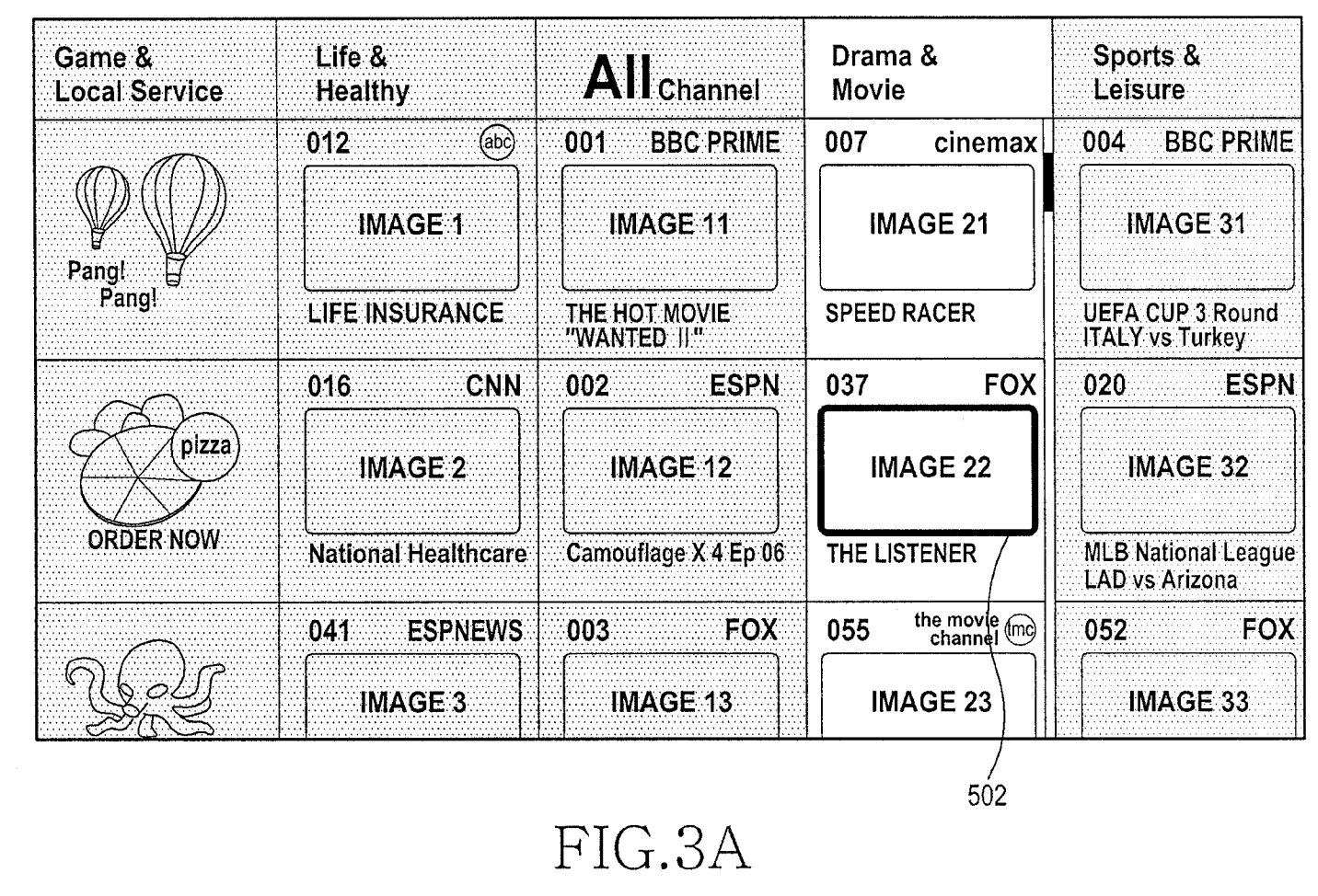
Figure 3B:
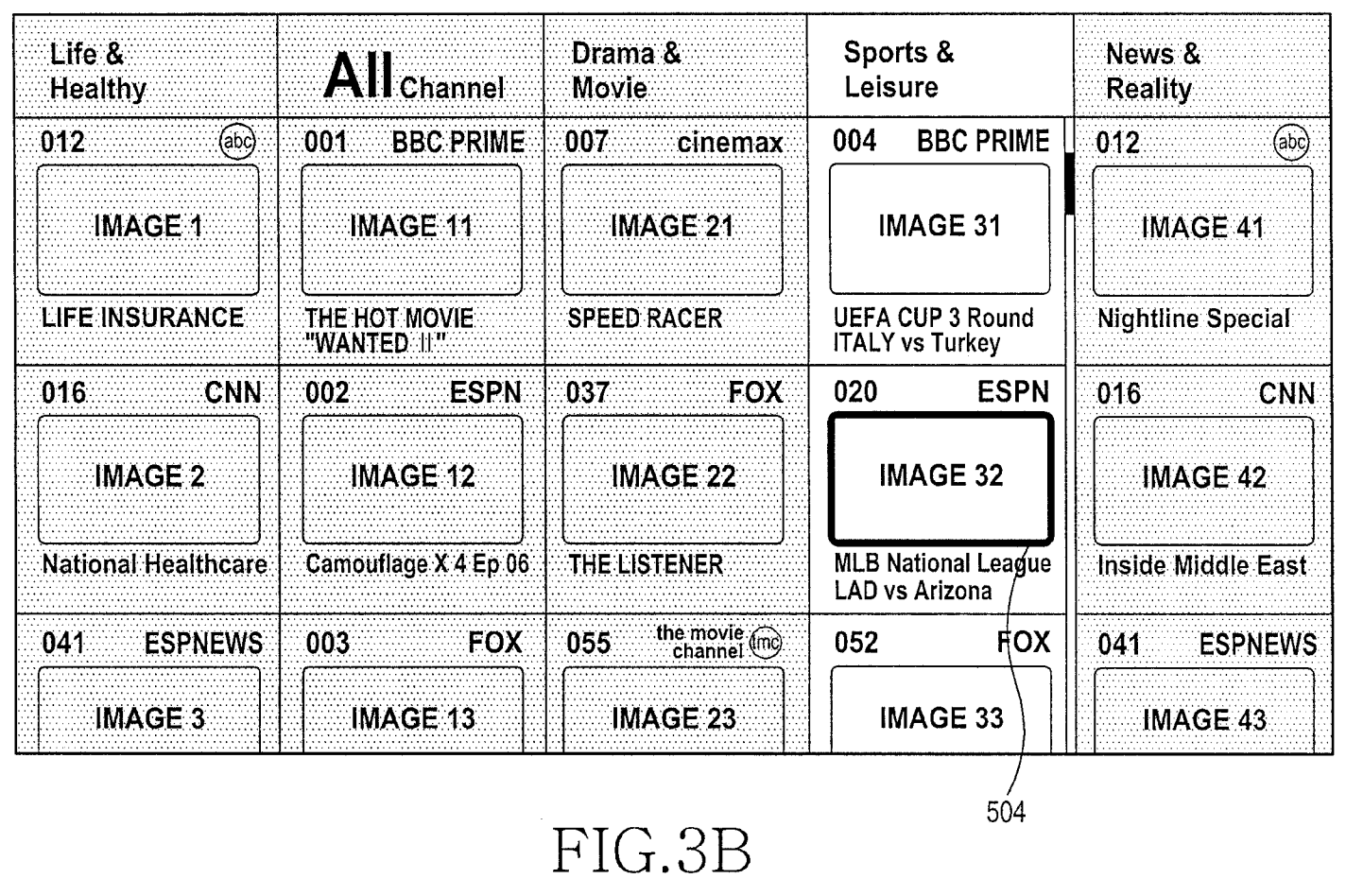
Figure 3D:

In FIG. 3A, it can be understood that a Fox broadcast provided through channel #037 in a Drama & Movie category is currently activated, as indicated by a reference number 502. This may be a temporary selection due to a direction key input by the user. FIG. 3B shows a case where an ESPN broadcast provided through channel #020 in the Sports & Leisure category, which is located on the very right of the Fox broadcast of channel #037 in the Drama & Movie category, is activated due to an input of a key (e.g. a right arrow key) by the user at the state shown in FIG. 3A (see a reference number 504). In this case, it can be checked that categories displayed on the entire screen have varied. That is, the Game & Local Service category displayed in FIG. 3A is deleted in FIG. 3B, while a News & Reality category, which is a new category, is generated. While FIGS. 3A and 3B illustrate a case where the entire screen moves according to an input of a direction key, the present invention may be implemented in such a manner that movement occurs between categories according to an input of a direction key in a state where the screen does not move and is fixed (see FIGS. 3C and 3D). One thing to be noted is that, when there is no category to move thereto any more within the screen according to an input of a left or right key, the leftmost or rightmost category in the screen is deleted, and a new category is generated and displayed.

FIG. 3C shows a case where a BBS Prime broadcast of channel #004 located on the ESPN broadcast of channel #020 in the Sports & Leisure category is activated due to an input of the up direction key by the user in the state shown in FIG. 3B (see a reference number 506).

FIG. 3D shows a case where an ABC broadcast of channel #012 in the News & Reality category, located on the very right of the BBS Prime broadcast of channel #004 in the Sports & Leisure category, is activated due to an input of the right direction key by the user in the state shown in FIG. 3C (see a reference number 508). Differently from the cases shown in FIGS. 3A and 3B, FIGS. 3C and 3D shows the cases where each category corresponding to a key input by the user is activated with the screen fixed.

Figure 3E:

FIG. 3E shows a case where a CNN broadcast of channel #016 in the News & Reality category is activated due to an input of a down direction key by the user in the state shown in FIG. 3D (see a reference number 510). FIGS. 3D and 3E show the case where the screen is not fixed, a new category is generated according to a key input by the user, and the entire screen moves according to the generation of the new category.

In contrast, when a specific moving picture content is not appointed in step 206, it means that a key input event for another purpose occurs, so that the digital broadcasting receiver 500 performs a corresponding operation in step 212. The procedure of step 212 has no direct relation with the present invention, so description thereof will be omitted.

When it is determined that a play request for a temporarily selected content has been input from the user in step 214, the digital broadcasting receiver 500 receives the play-requested content from a head-end side, and provides the play-requested content to the display means 410 of the user terminal in a full screen manner.

When the digital broadcasting receiver 500 receives a key input by the user in step 218 in the course of providing the selected content in a full screen manner in step 216, the digital broadcasting receiver 500 proceeds to step 220, where it is checked if the received key input corresponds to a key input related with a mini-EPG request. When the digital broadcasting receiver 500 receives a key input related with a mini-EPG request from the user in step 220, the digital broadcasting receiver 500 provides a mini-search mode according to an exemplary embodiment of the present invention through the display means 410 of the user terminal in step 222. In step 220, the key input related with a mini-EPG request may be a key input related with an EPG information search request. When the digital broadcasting receiver 500 receives a direction key for channel surfing in step 224 from the user, the digital broadcasting receiver 500 performs a control operation in such a manner as to activate and display a content corresponding to an arrow in a min-EPG of the mini-search mode in step 226. Thereafter, the digital broadcasting receiver 500 returns to step 214 so as to continuously repeat the aforementioned procedure.

FIGS. 4A and 4B show a case where a lattice-type moving picture contents are provided in the mini-search mode according to an exemplary embodiment of the present invention.

FIG. 4A illustrates a case where a mini-EPG is provided on one side of a screen, as indicated by a reference number 600, according to an EPG information search request by the user in the course of providing a moving picture content play-requested by the user according to an exemplary embodiment of the present invention. While FIG. 4 shows a case where a mini-EPG is provided on the right side of the display means 410 of the user terminal, the mini-EPG may be overlapped on and output through any one of the other sides (i.e. top, bottom and left sides) of the display means 410. In this case, the provided mini-EPG may be constituted by moving picture contents of a category to which a moving picture content currently being played in a full screen belongs.

FIG. 4B illustrates a case where lattice-type moving picture contents are searched for according to a channel surfing request by the user in the course of providing a mini-EPG in a mini-search mode according to an exemplary embodiment of the present invention.

When it is determined that the key input by the user does not correspond to a mini-EPG request in step 220, the digital broadcasting receiver 500 checks if a full-search mode is requested in step 228. When it is determined that a full-search mode is requested in step 228, the digital broadcasting receiver 500 proceeds to step 204, where a corresponding operation is performed. When it is determined that the key input has no connection with a full-search mode request in step 228, the digital broadcasting receiver 500 performs an operation corresponding to the key input in step 230.

As described with reference to FIGS. 3A to 3E, when up, down, left, and right direction keys are continuously input through the key input reception unit 405 by the user, the content screen configuration unit 200 activates and displays a content temporarily selected by the direction keys in order to distinguish the temporarily selected content from the other contents, which are not selected. That is, when an up or down direction key is input through the key input reception unit 405, the content screen configuration unit 200 temporarily selects a moving picture content corresponding to the input up or down direction key within a category to which currently temporarily selected moving picture content belongs. When a left or right direction key is input through the key input reception unit 405, the content screen configuration unit 200 selects another moving picture content within a category other than a category to which a currently temporarily selected moving picture content belongs.

Figure 5C:
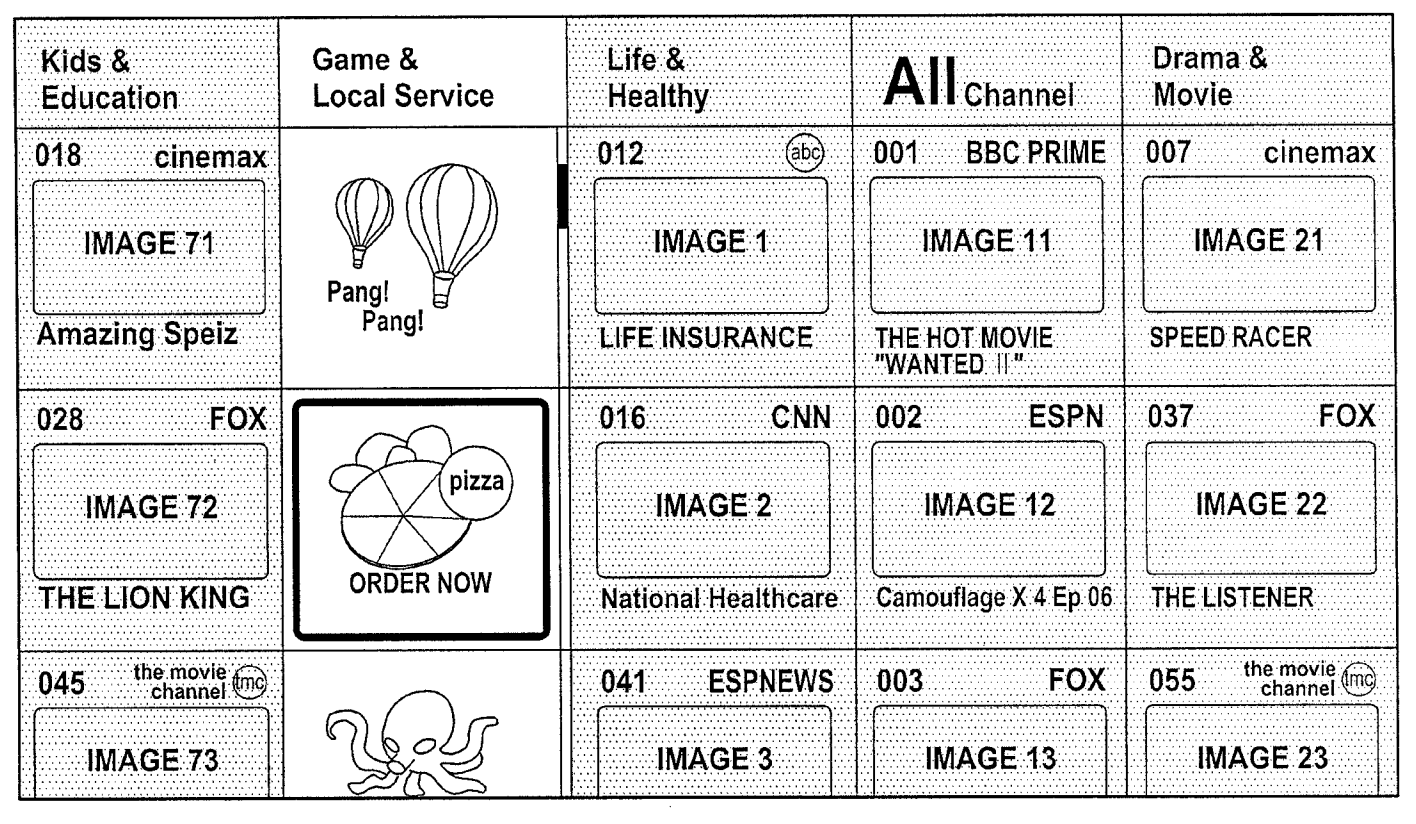

When step 204 is performed according to a full-search mode request in step 228, the digital broadcasting receiver 500 outputs a screen of a full-search mode, as shown in FIGS. 5A to 5C, through the display means 410 of the user terminal.

FIGS. 5A to 5C are views illustrating a case where lattice-type moving picture contents are provided in the full-search mode proposed by the present invention. Referring to FIGS. 5A and 5B, it can be understood that categories displayed in the full screen have varied due to channel surfing by the user. As described above, categories displayed in the full screen may not vary depending on channel surfing by the user.

Referring to FIG. 5C, according to the present invention, it is possible to provide the user with games included in the Game & Local Service category, and also it is possible to provide the user with an application through which food such as a pizza can be ordered. In order to provide application services included in the Game & Local Service category as described above, the content screen configuration unit 200 of the digital broadcasting receiver 500 has to transmit a request signal for a corresponding application to a head-end side through the data reception/conversion unit 100, and has to receive a response signal to the request signal.

In addition, according to an exemplary embodiment of the present invention, a shift operation may be performed from a mini-search mode to a full-search mode in three dimensions.

Description on the shift operation will be given with reference to FIGS. 6A to 6F.

FIGS. 6A to 6F illustrate a case where a cubic effect is provided when a shift operation is performed from a mini-search mode to a full-search mode according to an exemplary embodiment of the present invention. That is, FIGS. 6A to 6F show a case where, when a current display screen is in a mini-search mode according to a user's request, a request for a screen shift to a full-search mode is received from the user, and a three-dimensional shift is performed form the mini-search mode to the full-search mode.

While FIGS. 6A to 6F show only the case where a screen shift is performed from the mini-search mode to the full-search mode, the three-dimensional shift can be identically performed even when the current display screen is either the entire screen of an activated moving picture content or a full-search screen, and a display screen shift-requested thereto by the user is either a mini-search screen, or the entire screen of an activated moving picture content, or a full-search screen.

As described above, according to the present invention, when a screen shift is performed form the current display screen to a display screen shift-request thereto by the user based on the screen shift request by the user, a cubic effect is provided to the screen shift, so that it is possible to provide the user with a more convenient user interface.

Although the embodiments of the present invention are described regarding a channel selection as a representative example using the lattice-type moving picture channel list, the present invention is not limited thereto, and the present invention can be identically applied even when various moving picture contents (e.g. home shopping, on-demand type moving picture contents, etc.) capable of providing the lattice-type moving picture channel list are selected.

The method according to the present invention, as describe above, can be realized by a program and can be stored in a recording medium (such as a CD ROM, a RAM, a floppy disk, a hard disk, a magneto-optical disk, etc.) in a format that can be read by a computer. Such a procedure can be easily carried out by those skilled in the art, so a detailed description thereof will be omitted.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments and accompanying drawings but by the claims and the equivalents thereof.

For example, the aforementioned embodiments of the present invention have been described in consideration of only a state where moving picture contents are displayed through a display unit. However, through a display unit, it is possible to display any form among text data, still picture data, a film poster, a logo of a broadcasting station or distributing agency, a still image, audio clip data, and graphic data, as well as moving picture contents.

According to the present invention, in searching for a plurality of moving picture contents provided by a digital broadcasting system, it is possible to improve a user's convenience.

Also, since lattice-type moving picture contents are classified according to each category and are then provided, the user can check information on the currently-selected moving picture content according to each category, and use a corresponding moving picture content. In addition, each moving picture content can be easily searched for with a simple key input, so that a channel search can be easily achieved.

What is claimed is:

1. An apparatus for controlling a screen display configuration in a digital broadcasting receiver, the apparatus comprising:
   a data extraction unit configured to receive a broadcast signal through a broadcasting network, and to extract lattice-type moving picture content configuration data from the received broadcast signal, wherein lattice-type moving picture contents represent a plurality of moving picture contents which are simultaneously displayed in the form of a lattice on a screen;

a content screen configuration unit configured to extract multiple moving picture contents from the configuration data, and to output content screen configuration data based on the extracted multiple moving picture contents, wherein the extracted multiple moving picture contents correspond to moving picture contents selected by a user, and when a play request for an activated moving picture content is issued by the user, controlling a display unit to display the activated moving picture in a full screen; and the display unit configured to display the extracted multiple moving picture contents on one side of an entire screen in which the activated moving picture content is displayed, wherein the multiple moving picture contents correspond to contents included in a category to which the activated moving picture content belongs, wherein the display unit is arranged to display multiple moving picture contents in a full-search screen according to the content screen configuration data provided from the content screen configuration unit, wherein the full-search screen comprises a screen in which lattice-type moving picture contents are classified and displayed based on categories, wherein, when a mini-search request is issued by the user in a state where the activated moving picture content is displayed in a full screen, the content screen configuration unit provides the display unit with content screen configuration data, including moving picture contents of a category to which the activated moving picture content belongs, in order to provide a mini-search mode, so that the moving picture contents of a category to which the activated moving picture content belongs is displayed on one side of the full screen, wherein a mini-search screen for displaying the moving picture contents of the category to which the activated moving picture content belongs is overlapped and displayed on the full screen of the activated moving picture content, wherein, when a screen shift request is issued by the user, the content screen configuration unit controls the display unit to perform a three-dimensional shift from a current display screen to a display screen shift-requested by the user, wherein the full-search screen and the mini-search screen fully overlap each other, and wherein, if the process performing the three-dimensional shift is completed, the full-search screen is completely hidden by the mini-search screen.

2. The apparatus as claimed in claim 1, wherein, when one moving picture content among multiple moving picture contents displayed through the display unit is temporarily selected by the user, the content screen configuration unit controls the display unit to activate the temporarily-selected moving picture content and a category including the temporarily-selected moving picture content.

3. The apparatus as claimed in claim 2, wherein the content screen configuration unit controls the display unit to display a scroll bar for indicating a location of the activated moving picture content in the activated category on one side of the activated category or one side of the displayed screen.

4. The apparatus as claimed in claim 1, wherein the moving picture contents of the category to which the activated moving picture content belongs is displayed on one side of top, bottom left, and right sides of the full screen.

5. The apparatus as claimed in claim 1, wherein the current display screen is one among a full screen of the activated moving picture content, the full-search screen, and the mini-search screen; and the display screen shift-requested by the user is one between screens obtained by excluding the current display screen from among the full screen of the activated moving picture content, the full-search screen, and the mini-search screen.

6. The apparatus of claim 1, wherein the data extraction unit comprises:
a tuner;
a demodulator;
a demultiplexer; and
a multi-video content-related data decoder.

7. The apparatus of claim 1, wherein the data extraction unit comprises a tuner configured to receive the broadcast signal transmitted in a specific frequency band through the broadcasting network.

8. The apparatus of claim 1, wherein the data extraction unit comprises a demodulator configured to demodulate the broadcast signal received through the broadcasting network.

9. The apparatus of claim 1, wherein the data extraction unit comprises a demultiplexer configured to extract data from the broadcast signal.

10. The apparatus of claim 1, wherein the data extraction unit comprises a data decoder configured to decode configuration data of the lattice-type moving picture contents and data other than the configuration data of the lattice-type moving picture contents that is included in the broadcast signal.

11. A method for controlling a screen display configuration in a digital broadcasting receiver, the method comprising the steps of:

receiving a broadcast signal through a broadcasting network;

extracting lattice-type moving picture content configuration data from the received broadcast signal, wherein lattice-type moving picture contents represent a plurality of moving picture contents which are simultaneously displayed in the form of a lattice on a screen;

extracting multiple moving picture contents from the configuration data;

displaying the extracted multiple moving picture contents on one side of the entire screen in which an activated moving picture content is displayed, wherein the multiple moving picture contents correspond to contents included in a category to which the activated moving picture content belongs;

when a play request for the activated moving picture content is issued by the user, displaying the activated moving picture content in a full screen;

wherein, when a mini-search request is issued by the user in a state where the activated moving picture content is displayed in a full screen, displaying content screen configuration data on one side of the full screen, the content screen configuration data including the moving picture contents of a category to which the activated moving picture content belongs, wherein a mini-search screen for displaying the moving picture contents of the category to which the activated moving picture content belongs is overlapped and displayed on the full screen of the activated moving picture content, wherein when a screen shift request is issued by the user, performing a three-dimensional shift from a current display screen to a display screen shift-requested by the user, wherein the current display screen and the display screen shift-requested by the user fully overlap each other, and wherein, if the process performing the three-dimensional shift is completed, the current display screen is completely hidden by the display screen shift-requested by the user.

12. The method as claimed in claim 11, further comprising a step of, when one moving picture content among the multiple displayed moving picture contents is temporarily selected by the user, activating the temporarily-selected moving picture content and a category including the temporarily-selected moving picture content.

13. The method as claimed in claim 12, further comprising a step of displaying a scroll bar for indicating a location of the activated moving picture content in the activated category on one side of the activated category or one side of the displayed screen.

14. The method as claimed in claim 11, wherein the moving picture contents of the category to which the activated moving picture content belongs is displayed on one side of top, bottom left, and right sides of the full screen.

15. The method as claimed in claim 11, wherein the current display screen is one among a full screen of the activated moving picture content, the full-search screen, and the mini-search screen; and the display screen shift-requested by the user is one between screens obtained by excluding the current display screen from among the full screen of the activated moving picture content, the full-search screen, and the mini-search screen.

* * * * *